United States Patent
Le Roux et al.

(10) Patent No.: US 8,918,671 B2
(45) Date of Patent: Dec. 23, 2014

(54) TECHNIQUE FOR PROTECTING LEAF NODES OF A POINT-TO-MULTIPOINT TREE IN A COMMUNICATIONS NETWORK IN CONNECTED MODE

(75) Inventors: Jean-Louis Le Roux, Lannion (FR); Mohamad Chaitou, Paris (FR)

(73) Assignee: Orange, Paris (FR)

( * ) Notice: Subject to any disclaimer, the term of this patent is extended or adjusted under 35 U.S.C. 154(b) by 132 days.

(21) Appl. No.: 13/063,257

(22) PCT Filed: Sep. 8, 2009

(86) PCT No.: PCT/FR2009/051687
§ 371 (c)(1),
(2), (4) Date: Mar. 10, 2011

(87) PCT Pub. No.: WO2010/031945
PCT Pub. Date: Mar. 25, 2010

(65) Prior Publication Data
US 2011/0173492 A1  Jul. 14, 2011

(30) Foreign Application Priority Data
Sep. 16, 2008  (FR) ..................... 08 56229

(51) Int. Cl.
G06F 11/00 (2006.01)
H04L 12/761 (2013.01)
H04L 12/701 (2013.01)
H04L 12/707 (2013.01)
H04L 12/703 (2013.01)

(52) U.S. Cl.
CPC ............ H04L 45/00 (2013.01); H04L 45/16 (2013.01); H04L 45/22 (2013.01); H04L 45/28 (2013.01)
USPC ......................... 714/4.11; 709/239

(58) Field of Classification Search
USPC ........................... 714/4.11; 709/239
See application file for complete search history.

(56) References Cited

U.S. PATENT DOCUMENTS 7,903,545 B1 * 3/2011 Singh et al. ............. 370/218
2002/0191536 A1 * 12/2002 LaForge et al. ......... 370/216

(Continued)

FOREIGN PATENT DOCUMENTS

WO    WO 01/74001 A1    10/2001

OTHER PUBLICATIONS

Aggarwal et al., "Extensions to Resource Reservation Protocol—Traffic Engineering (RSVP-TE) for Point-to-Multipoint TE Label Switched Paths (LSPs); rfc4875.txt," IETF Standard, Internet Engineering Task Force, IETF, CH, pp. 1-53 (May 1, 2007).

(Continued)

*Primary Examiner* — Kamini Patel
(74) *Attorney, Agent, or Firm* — Drinker Biddle & Reath LLP

(57) ABSTRACT

A technique protects, in a communications network, a point-to-multipoint primary tree between a root node and primary leaf nodes of the network if a failure occurs affecting one of the primary leaf nodes. One network node receives from another upstream network node a request to protect the primary tree via a backup branch leading to a backup leaf node situated downstream from said node, if a failure affecting one of the primary leaf nodes to be protected occurs, the backup leaf node being associated with the primary leaf node to be protected. If the node is connected directly to the downstream primary leaf node to be protected, it configures a backup routing rule for routing packets from an upstream primary branch to the downstream backup branch and, possibly, to the downstream primary branch(es) and is activated in the event of a failure affecting the primary leaf node to be protected.

9 Claims, 3 Drawing Sheets

(56) References Cited

U.S. PATENT DOCUMENTS

| | | |
|---|---|---|
| 2006/0126496 A1* | 6/2006 | Filsfils et al. ............... 370/216 |
| 2006/0159009 A1 | 7/2006 | Kim et al. |
| 2006/0182049 A1 | 8/2006 | Rokui |
| 2006/0209787 A1 | 9/2006 | Okuda |
| 2007/0019646 A1* | 1/2007 | Bryant et al. ............... 370/390 |
| 2007/0165515 A1* | 7/2007 | Vasseur ...................... 370/216 |
| 2007/0174483 A1* | 7/2007 | Raj et al. .................... 709/238 |
| 2008/0056258 A1* | 3/2008 | Sharma et al. ............... 370/390 |
| 2009/0070875 A1* | 3/2009 | Garg et al. ...................... 726/23 |
| 2009/0252033 A1* | 10/2009 | Ramakrishnan et al. ..... 370/228 |
| 2012/0281524 A1* | 11/2012 | Farkas ........................ 370/221 |

OTHER PUBLICATIONS

Le Roux et al., P2MP MPLS-TE Fast Reroute with P2MP Bypass Tunnels; draft-ieft-mpls-p2mp-te-bypass-02.txt, Internet Draft, IETF, pp. 1-14 (Mar. 1, 2008).

* cited by examiner

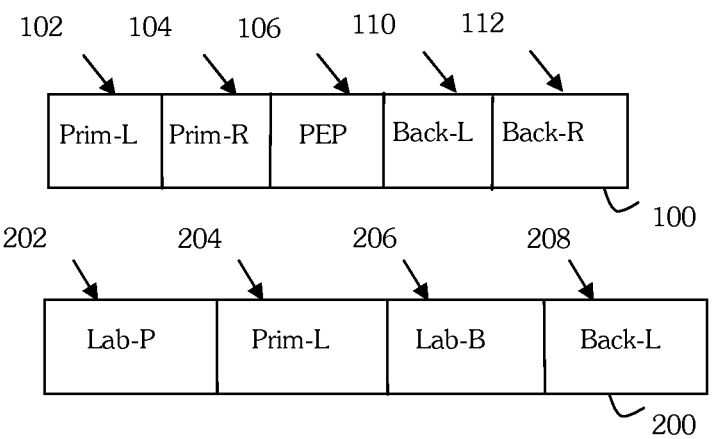
Fig. 5a
Fig. 5b
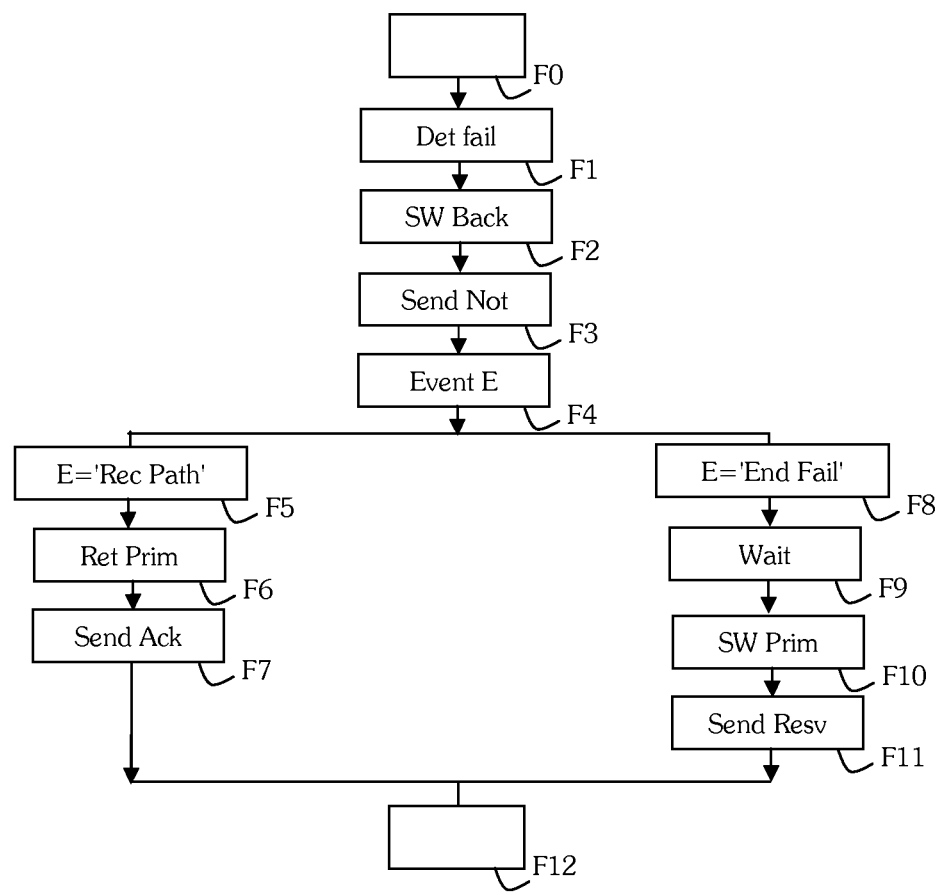
Fig. 4

TECHNIQUE FOR PROTECTING LEAF NODES OF A POINT-TO-MULTIPOINT TREE IN A COMMUNICATIONS NETWORK IN CONNECTED MODE

CROSS-REFERENCE TO RELATED APPLICATIONS

This application is the U.S. national phase of the International Patent Application No. PCT/FR2009/051687 filed Sep. 8, 2009, which claims the benefit of French Application No. 08 56229 filed Sep. 16, 2008, the entire content of which is incorporated herein by reference.

FIELD OF THE INVENTION

The invention relates to a technique for protecting a point-to-multipoint tree from a root node to leaf nodes in a communications network in connected mode in the event of a failure affecting one of the leaf nodes.

The field of the invention is that of communications networks and more particularly packet transport networks in connected mode.

BACKGROUND

Transporting services such as an Internet Protocol television (IPTV) service requires traffic engineering mechanisms for optimizing the use of resources, guaranteeing a quality of service appropriate to the service, and minimizing service outages in the event of failures. The Point-To-Multipoint Multi-Protocol Label Switching Traffic Engineering (P2MP MPLS-TE) technology is designed to do this. It allows a point-to-multipoint tree to be set up in a Multi-Protocol Label Switching (MPLS) communications network allowing reservation of resources. The associated protocol specified in the Internet Engineering Task Force (IETF) document RFC 4875 is an extension of the Resource Reservation Protocol-Traffic Engineering (RSVP-TE) protocol and allows MPLS trees known as LSP P2MP trees to be set up in which packets are routed explicitly. Such trees replicate traffic from a node known as the root node to a set of nodes known as leaf nodes that are then responsible for routing the traffic to the receivers. P2MP RSVP-TE explicit routing allows trees to be set up that minimize the cost in terms of bandwidth consumption; it further allows reservation of resources and therefore a guaranteed quality of service when routing packets.

To minimize the impact of a failure on a service and in particular on television pictures in an IPTV service, it is necessary to be able to reroute packets in less than fifty milliseconds. The P2MP MPLS-TE Fast Reroute (FRR) mechanism specified in the IETF document "draft-ietf-mpls-p2mp-te-bypass-01" relies on local backup trees bypassing the protected element; it therefore allows the above-mentioned level of security to be guaranteed in the event of a link or transit node failure in an LSP P2MP network.

In contrast, it does not allow fast rerouting of packets in a time compatible with services requiring a guaranteed quality of service in the event of failure of leaf nodes of a label-switched point-to-multipoint tree.

Below, references to a failure affecting a leaf node refer to a failure of the node itself or a failure of a link supporting a branch coming from it.

SUMMARY

One object of the invention is to remedy these shortcomings/drawbacks of the prior art and/or to improve thereon.

The invention provides a technique for protecting, in a communications network in connected mode, a point-to-multipoint primary tree between a root node and primary leaf nodes of the network in the event of a failure affecting one of the primary leaf nodes, including the following steps executed by a node of the network:

a step of receiving from another network node, referred to as the upstream node, a request to protect the primary tree by at least one backup branch leading to a backup leaf node situated downstream from said node in the event of a failure affecting at least one of the primary leaf nodes to be protected, the backup leaf node being associated with the primary leaf node to be protected; and if the node is connected directly to the downstream primary leaf node to be protected, a step of configuring a backup routing rule aiming to route packets from an upstream primary branch leading to a downstream backup branch and, if appropriate, to a primary downstream branch or branches that is activated in the event of a failure affecting said primary leaf node to be protected.

A point-to-multipoint primary tree is provided from a root node to primary leaf nodes. A node receiving a protection request from another node is situated downstream of that other node. The branches of the tree going from the node to the primary leaf nodes are primary downstream branches. The primary branch going to the node from the other node is the upstream primary branch. Thus for a node of a point-to-multipoint tree an upstream branch enters the node and one or more branches leave the node on the downstream side to go to one or more leaf nodes.

A set of backup branches for one or more branches is also provided from the root node of the primary tree to one or more backup leaf nodes. A backup leaf node is designed to protect a primary leaf node and is therefore associated with it.

A node is called a protector node when it has received the protection request from a node on its upstream side and a primary leaf node is directly connected to it. It adds the backup routing rule to its routing table in order to protect the primary tree in the event of failure of the primary leaf node that it protects. The backup routing rule configured in this way allows routing of traffic from the upstream primary branch to the downstream backup branch and where appropriate to downstream primary branches. These are primary branches not affected by the failure and not using the same physical link as the downstream backup branch. Traffic routed along the backup branch is broadcast to the downstream backup leaf node and thus where appropriate to all the downstream primary leaf nodes. The protector node being connected directly to the primary leaf node to be protected, it is able to detect a failure very quickly, to activate the backup routing rule, and thus to continue broadcasting the data with a delay of less than 50 milliseconds, i.e. within a time compatible with services requiring a high quality of service. The decision is made as close as possible to the primary leaf node to be protected and does not need to be referred to the root node. Moreover, activation of the backup rule allowing routing of traffic downstream of the protector node has no impact on the operation of the part of the primary tree situated upstream of the protector node that has detected the failure. When a protector node has gone to the backup mode a hybrid point-to-multipoint tree is obtained of which a first part upstream of the protector node is made up of primary branches, a second part downstream of this protector node is made up of the backup branch, and a third part downstream of the protector node is made up downstream primary branches not affected by the failure. By activating its backup routing rule the protector node allows connection of these three parts.

The only constraint that applies to determining paths constituting the primary tree and the backup branches is to avoid having a backup leaf node upstream of the primary leaf node that it protects.

This protection mechanism consumes few resources at the protector nodes, in particular in terms of RSVP states to be maintained.

In one implementation, a request for setting up the backup branch is associated with the protection request, the configuration step being effected when the backup branch from said node to a downstream node is set up.

The backup routing rule is then configured when the backup branch downstream of the protector node is set up.

Furthermore, a request for setting up the primary tree is associated with the protection request, the configuration step being effected when at least one primary branch from said node to a downstream node is set up.

During a configuration stage it is possible to determine paths constituting a global point-to-multipoint tree from the root node to the primary and backup leaf nodes. The path of the global point-to-multipoint tree encapsulating the traffic of all the broadcast channels is calculated including both sets of leaf nodes (primary and backup) simultaneously, which allows the cost, i.e. the number of links of the resulting tree, to be minimized by applying a cost optimization algorithm, for example a Steiner algorithm.

Once the path of the global tree has been calculated, the global tree is set up by means of the mechanisms defined in the document RFC 4875 but indicating to the nodes of the tree that protection of the primary leaf nodes must be activated and enabling the nodes of the tree to distinguish between the downstream leaf node types, primary or backup.

The primary tree and the backup branches are then set up conjointly and resources reserved accordingly. Packets are routed on only one of the two branches at a time over a link between two nodes of the tree provided for both a primary branch and a backup branch.

The method further includes a step of configuring at least one activated secondary routing rule aiming to route packets coming from an upstream backup branch to the downstream backup branch and where appropriate to downstream primary branches.

The secondary routing rule or rules allow(s) routing of packets received with a corresponding backup label to the downstream branch or branches of the primary tree and to a downstream backup leaf node the primary leaf node of which is not situated downstream. Thus the backup leaf node executes its function of protecting the primary leaf node as soon as the failure is detected by an upstream protector node.

Moreover, in the event of detection of a failure affecting said primary leaf node to be protected, the method further includes a step of notifying said failure to the root node of the primary tree.

The root node of the primary tree being informed of the failure affecting a given primary leaf node, it is possible for it to monitor the duration of this failure, for example in order to take maintenance action if appropriate.

The invention also provides a protector node in a communications network in connected mode for protecting a point-to-multipoint primary tree between a root node and primary leaf nodes of the network in the event of a failure affecting one of the primary leaf nodes, including:

receiver means for receiving from another network node, referred to as the upstream node, a request to protect the tree by means of a backup branch leading to a backup leaf node situated downstream from said node in the event of a failure affecting said primary leaf node to be protected, the backup leaf node being associated with the primary leaf node to be protected; and configuration means for configuring a backup routing rule aiming to route packets from an upstream primary branch leading to a downstream backup branch and, if appropriate, to a downstream primary branch or branches and activated in the event of a failure affecting said primary leaf node to be protected.

The protector node further includes notification means for sending a failure notification to the root node of the primary tree in the event of detection of a failure affecting a primary leaf node to be protected.

The invention further provides a communications system in a communications network in connected mode including:

at least one root node, said root node being the root of a point-to-multipoint primary tree to primary leaf nodes, including sending means for sending a request to protect the primary tree by a backup branch to a backup leaf node situated downstream of said root node in the event of a failure affecting one of the primary leaf nodes to be protected, the backup leaf node being associated with the primary leaf node to be protected;

at least one protector node as described above; and primary and backup leaf nodes.

The invention further provides a computer program including instructions for execution of the protection method described above by a node of a communications network in connected mode when that program is executed by a processor.

The invention further provides a signal sent by a node of a communications network to another node of the network and carrying a request to protect a point-to-multipoint primary tree between a root node and primary leaf nodes in the event of a failure affecting one of the primary leaf nodes to be protected by a backup branch to a backup leaf node situated downstream of said other node, the backup leaf node being associated with the primary leaf node to be protected.

BRIEF DESCRIPTION OF THE DRAWINGS

The invention can be better understood with the aid of the following description of one particular implementation of the method of the invention with reference to the appended drawings, in which:

FIG. 4 shows the steps of a second stage of the protection method of one particular implementation of the invention;

FIG. 5a shows a message of one particular implementation of the invention for requesting setting-up of a tree; and FIG. 5b shows a response message of one particular implementation of the invention to a set-up request.

DETAILED DESCRIPTION

Figure 1:
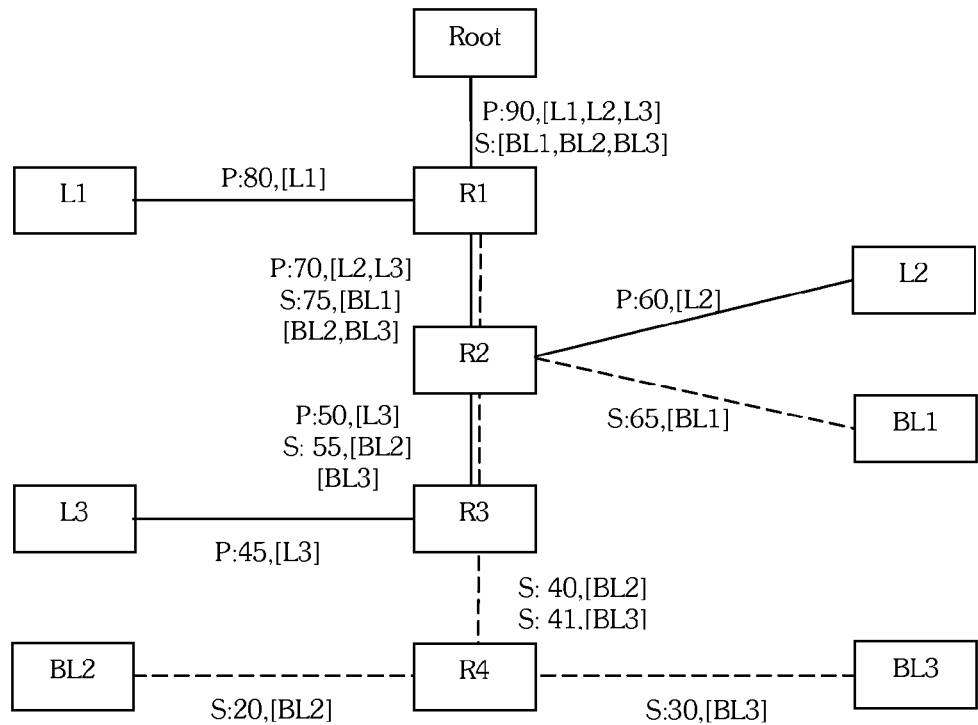
FIG. 1 shows diagrammatically a communications network in which the method of the invention is used.

FIG. 1 shows diagrammatically a communications network. This network includes a plurality of routing nodes Root, R1 to R4. The network also includes three leaf nodes L1 to L3 known as primary leaf nodes to which are connected receivers that are not shown. A point-to-multipoint tree allows broadcasting of broadcast or multicast channels from a root node Root to the primary leaf nodes via branches referred to below as primary branches. This tree is shown in FIG. 1 in solid line. A primary branch goes from the root node Root to the node R1. Two primary branches leave the node R1, the first to the primary leaf node L1, the second to the node R2. Two primary branches leave the node R2, the first to the primary leaf node L2, the second to the node R3. A primary branch goes from the node R3 to the primary leaf node L3.

By convention, an upstream branch is a branch from which a node receives a request to protect a point-to-multipoint tree and a downstream branch is a branch of the tree on which a node forwards the protection request to other nodes. Nodes are situated downstream of a first node when they are situated in the tree structure of the tree coming from that first node.

In order to protect a primary leaf node L1 to L3 in the event of a failure affecting it, an associated backup leaf node BL1 to BL3 is provided for each primary leaf node. The backup leaf node BL1 (respectively BL2, BL3) routes traffic from a set of multicast channels to the set of receivers connected to the primary leaf node L1 (respectively L2, L3) in the event of a failure affecting that node. The backup leaf node BL1 is connected to the node R2. The backup leaf nodes BL2 and BL3 are connected to the node R4.

According to the invention, additional branches referred to as backup branches are added to the point-to-multipoint tree enabling traffic to be routed to the backup leaf nodes BL1-BL3. These backup branches are shown in dashed line in FIG. 1. They originate from particular routing nodes referred to as protector nodes. These protector nodes are special in that they are situated upstream of the primary leaf nodes and connected directly to one or more primary leaf nodes. They are thus able to detect a failure in the primary leaf node or nodes in times making it possible to minimize the impact of failures on broadcast services. For example, for a Synchronous Digital Hierarchy (SDH) interface, the protector node is able to detect a failure in less than five milliseconds. A backup branch of the tree goes from the node R1 protecting the primary leaf node L1 to the node R2. Two backup branches come from the protector node R2 of the primary leaf node L2, a first going to the backup leaf node BL1 and the second going to the node R3. A backup branch goes from the protector node R3 of the backup leaf node L3 to the node R4. Two backup branches go from the node R4 to the backup leaf nodes BL2 and BL3. Only the nodes R1, R2, and R3 have a protector node function in respect of the primary leaf nodes of the point-to-multipoint tree.

In the nominal mode, only the branches of the primary tree are active and thus only the primary leaf nodes transmit packets relating to the multicast channels to all the receivers.

FIG. 5a shows a message 100 requesting setting up of a point-to-multipoint tree. Under the RSVP-TE protocol, for example, this is a "Path" message.

Such a message 100 includes parameters necessary for setting up primary branches of the tree, notably a list 102 of primary leaf nodes and a list 104 of explicit paths to the primary leaf nodes.

According to the invention, the message may further include:
   a field 106 indicating that the point-to-multipoint tree must be set up using the protection mechanism described below, referred to as to the P2MP Egress Protection (PEP) mechanism;
   a list 110 of backup leaf nodes, identified by their addresses in the communications network, for example, each backup node being associated with a respective primary leaf node; and
   a list 112 of explicit paths to the backup leaf nodes.

Thus the point-to-multipoint tree set-up request as described above further requests setting up of primary branches of the tree from the root node to the primary leaf nodes and setting up of backup branches of the tree to backup leaf nodes for protecting the primary leaf nodes. This request is a request to protect of the tree in the event of a failure affecting one of the primary leaf nodes via backup branches to backup leaf nodes situated downstream of the node receiving the protection request, a backup leaf node being associated with a primary leaf node.

Under the RSVP-TE protocol, for example, the field 106 may be transported in the RSVP-TE object "LSP_Attribute" defined in the document RFC 4420. The list 110 of backup leaf nodes may be transported in a new RSVP-TE object "Backup S2L_SUB_LSP" including an identifier of the backup leaf node and an identifier of the protected primary leaf node. The list 112 of explicit paths to the backup leaf nodes may be transported in a new RSVP-TE object "BACKUP EXPLICIT ROUTE" (respectively "BACKUP RECORD_ROUTE") and "BACKUP P2MP SECONDARY_EXPLICIT_ROUTE" (respectively "BACKUP P2MP SECONDARY_RECORD_ROUTE") respectively having the same format as the objects "EXPLICIT_ROUTE" (respectively "RECORD_ROUTE") and "SECONDARY_EXPLICIT_ROUTE" (respectively "SECONDARY_RECORD_ROUTE") defined in the document RFC 4875.

FIG. 5b shows a message 200. This message may be a response to the point-to-multipoint tree set-up request 100. Under the RSVP-TE protocol, for example, it is an "Resv" message.

Such a message 200 may include:
   a list 202 of primary leaf nodes and an associated primary label 204;
   a list 206 of backup leaf nodes and an associated backup label 208 for each backup leaf node protecting a primary leaf node that is not situated downstream.

The message 200 may also include a field, not shown, for indicating that the PEP mechanism has been triggered. For example, it is possible to provide a new attribute in the sub-object "RRO Attributes" of the objects "RECORD ROUTE" and "Backup RECORD_ROUTE" specified in the document RFC 4420.

The protection method as implemented by the node R1 of the communications network is described below.

In a step E1 of receiving a request to set up a point-to-multipoint tree, the node R1 receives from a node a point-to-multipoint tree set-up request 100 including a list 102 of downstream primary leaf nodes, a list 104 of explicit paths to the primary leaf nodes, a field 106 indicating that the point-to-multipoint tree must be set up using the PEP mechanism, a list 110 of backup leaf nodes, a backup leaf node being associated with a primary leaf node, and a list 112 of explicit paths to the backup leaf nodes. This message corresponds to a request to protect the primary tree in the event of a failure affecting one of the primary leaf nodes from the list 102 by means of backup branches to backup leaf nodes situated downstream of said node, a backup leaf node being associated with a primary leaf node to be protected.

In the step E4, the node R1 determines whether it is an end node of the point-to-multipoint tree.

If the node that has received the set-up request is not an end node of the tree, it determines from the received request a list of nodes to which it must forward the tree set-up request and in a step E5 sends each of them a new, adapted set-up request 100. This is the method of processing a set-up request described for the RSVP-TE mechanism in the document RFC 4875 able to process two lists, one of primary leaf nodes and their respective paths, the other of backup leaf nodes and their respective paths. For example, the node R1 sends the primary leaf node L1 a primary branch set-up request and the routing node R2 a request to set up primary branches to the primary leaf nodes L2 and L3 and backup branches to the backup leaf nodes BL1, BL2, BL3.

The node R1 then waits to receive responses to the sent set-up requests.

In a step E6, the node R1 receives a response 200 to the set-up request sent to the node R2, for example, including:
 a list 202 of primary leaf nodes (L2, L3) and an associated primary label 204 (70), denoted P:70,[L2,L3] in FIG. 1; and
 a list 206 of backup leaf nodes, including a backup label 208 (75) associated with the backup leaf node BL1, denoted S:75,[BL1] in FIG. 1, and a list of downstream backup leaf nodes protecting downstream primary leaf nodes, denoted [BL2,BL3] in FIG. 1.

In a configuration step E7 the node R1 stores a primary branch (70,R2) and a backup branch (75,R2) in a routing table 302.

In a step E8 the node R1 verifies whether it has received all the responses to the sent set-up requests. The steps E6 to E8 are repeated until all responses have been received.

In the particular example of FIG. 1, in a new iteration of the step E6, the node R1 receives a response 200 from the primary leaf node L1 including only a primary label (80) associated with that primary branch. In the step E7 it stores a primary branch (80, L1) in the routing table 302.

When all responses to the sent set-up requests have been received, in a label-assigning step E9 the node assigns a primary label, if it is situated on the primary tree, and at least one backup label. To be more precise, it assigns a backup label for each downstream backup leaf node protecting a primary leaf node that is not situated downstream. In a configuration step E10 the node stores in the routing table 302, in addition to a primary routing rule, a backup routing rule that is deactivated and associates with the primary label the associated downstream backup branch and, where appropriate, the downstream primary branch or branches not affected by the failure and not using the same physical link as the backup branch. In the particular case of the node R1, it assigns a primary label (90) and stores in its routing table 302 an activated primary routing rule associating the primary label (90) with the two primary branches (70, R2) and (80, L1). Being a protector node of the node L1, it also stores a deactivated backup routing rule associated with the primary routing rule, associating the backup branch (75, R2) with the primary label (90). This backup routing rule is activated in the event of a failure affecting the primary leaf node L1. In the particular case of the node R1, given that it has no downstream backup leaf nodes protecting a primary leaf node that is not situated downstream, it does not allocate any backup label.

Still in the configuration step E10, the node further provides at least one secondary routing rule in the routing table 302, this rule being activated and associating with one of the assigned backup labels the associated downstream backup branch and the downstream primary branch or branches.

Following these configuration steps E1 to E10, a routing node has in its routing table 302, if appropriate:
 if the node has only downstream backup leaf nodes, one or more activated secondary rules allowing routing of packets received with one of the backup labels to the corresponding backup branch;
 if the node has both primary leaf nodes and downstream backup nodes:
  an activated primary rule allowing routing of packets received with the primary label to the primary branches of the tree;
  one or more activated secondary rules allowing routing of packets received with one the backup labels to the corresponding backup branch and the downstream primary branch or branches; and
 if the node is also a protector node of a primary leaf node, a deactivated backup rule associated with the primary rule allowing routing of the packets received with the primary label to the backup branch and where appropriate to the downstream primary branch or branches not affected by the failure and not using the same physical link as the backup branch.

The routing node is then in a mode called the nominal operating mode.

Then, in a step E11 of responding to the node that sent the set-up request, the node sends a responds 200 to the set-up request sent by the upstream node, including:
 a list 202 of primary leaf nodes and an associated primary label 204 (70); and
 a list 206 of backup leaf nodes including one or more backup labels 208 associated with one or more backup leaf nodes protecting a primary leaf node that is not situated downstream and a list of downstream backup leaf nodes protecting downstream primary leaf nodes.

In the particular case of the node R1, it sends the root node Root a response 200 including the list 202 of primary leaf nodes (L1, L2, L3) and an associated primary label 204 (90), denoted P:90,[L1, L2, L3] in FIG. 1.

In the case of a node having at least one downstream backup leaf node and for which the primary leaf node is not situated downstream, for example the node R2, in the response step E11 the node R2 sends the node R1 a response 200 including:
 the list 202 of primary leaf nodes (L2, L3) and an associated primary label 204 (70), denoted P:70,[L2,L3] in FIG. 1;
 the list 206 of downstream backup leaf nodes, including:
  two backup leaf nodes BL2 and BL3, denoted [BL2, BL3] in FIG. 1, protecting downstream primary leaf nodes;
  the backup leaf node BL1 and an associated backup label 208 (55), denoted S:75,[BL1] in FIG. 1, the backup leaf node BL1 protecting the primary leaf node L1, which is not situated downstream.

Thus the primary tree set-up request propagates from node to node in the tree structure, from the root node to the end nodes of the primary branches and the backup branches. The response then propagates in the opposite direction from the end nodes to the root node. Following the above configuration steps E1 to E11, the respective routing tables of the nodes of the tree and the protector nodes have been configured to allow routing of traffic in the event of failure affecting a primary leaf nodes using their respective backup routing rules, i.e. by rerouting traffic received on an upstream primary branch to the backup branch and where appropriate to a downstream primary branch or branches not affected by the failure and not using the same physical link as the backup branch. The primary and backup branches being connected to the same tree structure, the method is particularly advantageous in that it limits consumption of resources in terms of bandwidth and RSVP states to be stored in the nodes.

If the step E4 determines that the node that has received the set-up request is an end node of the tree, the protection method goes directly to the label-assigning step E9.

The protection method implemented thereafter by a protector node is described below with reference to FIG. 4.

In a step F0 the protector node R1 monitors the primary leaf node L1. It is in the nominal operating mode. For example, in the particular case of the node R1, packets received in the transfer plane with the primary label (90) are forwarded to the routing node R2 with the primary label (70) and to the primary leaf node L1 with the primary label (80).

In a failure detection step F1, the protector node R1 detects a failure affecting the primary leaf node L1. Given that it is directly connected thereto node, it is able to detect this failure in a time compatible with services demanding very low outages.

In a step F2, the protector node R1 goes to a mode called the backup operating mode. In other words, the protector node R1 activates the backup rule and deactivates the primary rule in the routing table 302.

Following this step F2, and in the particular case of the node R1, packets received in the transfer plane with the primary label (90) are forwarded to the routing node R2 with the backup label (75).

Then, in a step F3, the protector node R1 sends the root node Root a notification of the failure affecting the primary leaf node L1. Under the RSVP-TE protocol, this may be an "Resv" message including an indication that the PEP mechanism has been triggered, a failed primary leaf node identifier, and a list of activated backup leaf nodes (i.e. those currently receiving traffic via the backup branches of the tree).

Turning now to the node R2, it receives in the transfer plane packets with which the backup label (75) is associated. Given that its own routing table 302 includes an activated secondary rule for routing packets received with the backup label (75) to the downstream backup branch and the downstream primary branch, traffic is therefore routed during the failure to the backup leaf node BL1 and thus to the receivers of L1. The primary leaf nodes situated downstream of this node continue to receive traffic. The traffic is then routed to the downstream activated backup leaf node and to all the downstream primary leaf nodes.

The detection of the failure and changing over to the backup tree, i.e. rerouting of the packets, take less than fifty milliseconds. Note that only the protector node R1 has to modify the activation states of its primary and backup rules. The other nodes of the tree need do nothing to allow routing of the traffic, their respective secondary rules being activated permanently.

Then, in a step F4, the protector node R1 detects an event.

If the event detected is the end of the failure in the step F8, the protector node R1 triggers a time-out in a step F9 and waits for it to expire. If the time-out expires without the failure occurring again the protector node R1 returns to a nominal operating mode in a step F10, i.e. it deactivates the backup rule and activates the primary rule. Thus the traffic is switched back to the primary branches of the downstream tree.

Then, in a step F11, the protector node R1 indicates to the root node that it has returned to the nominal mode.

On returning to the step F4, if the detected event is reception of a message requesting a return to the nominal mode coming from the root node Root in the step F5, the protector node R1 deactivates the backup rule and activates the primary rule. It then sends the root node a confirmation of the return to the nominal mode in a step F7.

Having received a notification of the failure affecting the primary leaf node L1, the root node Root is aware of the failure and is able to modify the tree by adding to it a new primary leaf node to replace the failed primary leaf node. If the protector node of this new primary leaf node is the same as that of the failed primary leaf node, it suffices to return to the nominal mode. Otherwise, the root node may send a new protector node of this new primary leaf node a request for protection by one or more backup branches.

The protection method is described in the context of protection of all primary leaf nodes by a set of backup leaf nodes. It is also possible to provide for only a sub-set of the primary leaf nodes to be protected.

In the implementation described above, the tree protection request in the event of a failure affecting one of the primary leaf nodes to be protected by one or more backup branches to backup leaf nodes (BL1-BL3) situated downstream of the node is carried by a request to set up the primary tree and backup branches.

It is equally possible to separate from each other the requests to set up the primary tree and backup branches. The content of the set-up request 100 is then adapted accordingly. It is also possible to set up protection in a stage after the setting up of the primary tree and backup branches.

As shown in FIG. 1 diagrammatically and by way of non-limiting example, it is possible to apply the protection offered to the various nodes of the communications network as shown. The following description refers to the stage of propagation of responses to the set-up requests.

The node R4 receives two responses S:20,[BL2] and S:30,[BL3] from the backup leaf nodes BL2 and BL3, respectively. In the step E9 it assigns two backup labels (40 and 41) and in the step E10 it configures its routing table and sends S:40,[BL2] and S:41,[BL3] to the node R3. The routing table of the node R4 contains two activated secondary rules for routing traffic received with the label (40) to the node BL2 with the label 20 and traffic received with the label (41) to the node BL3 with the label 30, denoted {40:(20,BL2)} and {41:(30,BL3)}.

The node R3 receives responses S:40,[BL2], S:41,[BL3] from the node R4 and P:45,[L3] from the primary leaf node L3. In the step E9 it assigns the primary label (50) and the backup label (55) and in the step E10 it configures its routing table and sends P:50,[L3], S:55,[BL2], [BL3] to the node R2. The routing table of the node R3 contains an activated primary rule {50,(45,L3)}, a deactivated backup rule {50:(41,R4)}, and an activated secondary rule {55:(40,R4),(45,L3)}.

The node R2 receives responses P:50,[L3], S:55,[BL2], and [BL3] from the node R3, P:60,[L2] from the primary leaf node L2, and S:65,[BL1] from the backup leaf node BL1. In the step E9 it assigns the primary label (70) and the backup label (75) and in the step E10 it configures its routing table and sends P:70,[L2,L3], S:75,[BL1], and [BL2,BL3] to the node R1. The routing table of the node R2 contains an activated primary rule {70,(50,R3),(60,L2)}, a deactivated backup rule {70:(55,R3)}, and an activated secondary rule {75:(50,R3),(65,BL1),(60,L2)}.

The node R1 receives responses P:70,[L2,L3], S:75,[BL1] and [BL2,BL3] from the node R2 and P:80,[L1] from the primary leaf node L1. In the step E9 it assigns the primary label (90) and in the step E10 it configures its routing table and sends P:90,[L1,L2,L3] and S:[BL1,BL2,BL3] to the root node. The routing table of the node R1 contains an activated primary rule {90,(70,R2),(80,L1)} and a deactivated backup rule {90, (75,R2)}.

The situation of a failure in the primary leaf node L1 is specifically described above in the description of the protection method.

Another example of a failure situation is described below, namely failure of the primary leaf node L2. In this situation, the protector node R2 detects the failure, deactivates the primary rule, and actives the backup rule, i.e. packets received on the upstream primary branch from the node R1 are routed to the part of the backup branch coming from the node R2, i.e. the downstream part.

If a failure also occurs in the primary leaf node L1, the protector node R1 also switches to backup mode and packets are then routed in the part of the backup branch coming from the node R1. When the node R1 returns to the nominal mode following detection of an end of failure of the node L1, the protector node R2 has not been affected by the modifications linked to the failure affecting the primary leaf node L1 and is still in backup mode. Packets are routed correctly to the receivers.

Similarly, if the failure of the primary leaf node L2 terminates before that of the primary leaf node L1, the protector node R1 is not affected by the protector node R2 returning to the nominal mode. Packets are routed correctly to the receivers.

It is possible to combine the protection method as defined above and Fast Reroute protection of the link between two routing nodes as specified in the IETF document "P2MP Fast Reroute", "draft-ietf-mpls-p2mp-te-bypass-01".

Figure 2:
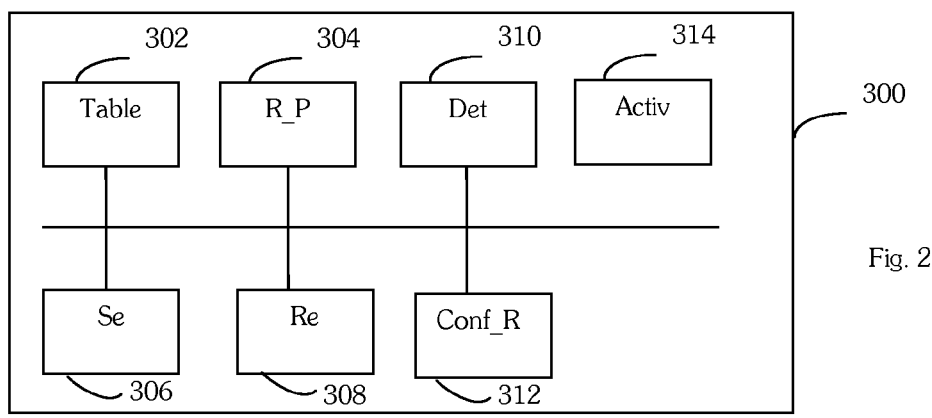
FIG. 2 shows a device of one particular embodiment of the invention.
Figure 3:
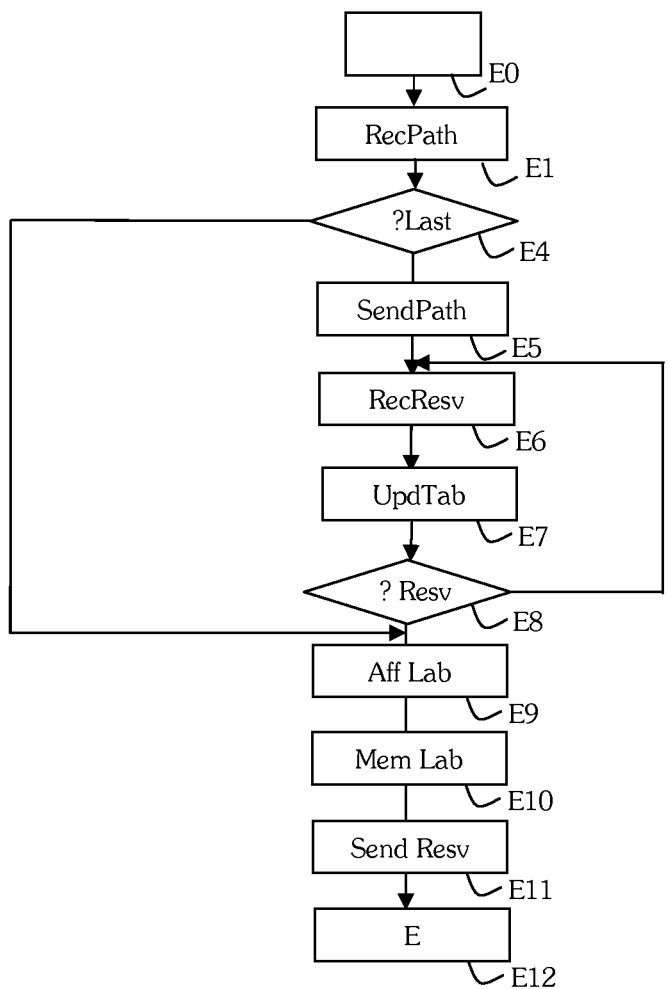
FIG. 3 shows the steps of a first stage of the protection method of one particular implementation of the invention.

FIG. 2 shows a node 300 of a communications network.
The node includes:
  a routing table 301, denoted "Table" in FIG. 2, for storing routing rules, activated or not;
  packet routing means 304, denoted "R_P" in FIG. 2, for routing packets as a function of routing rules stored in the routing table 302;
  a module 306, denoted "Se" in FIG. 2, for sending messages in the control plane under a given protocol;
  a module 308 for receiving messages in the control plane under the given protocol, denoted "Re" in FIG. 2; and
  a failure start and end detector module 310, denoted "Det" in FIG. 2, for detecting a failure affecting a given node.

In the particular implementation described here, the modules 306 and 308 implement the RSVP-TE protocol in accordance with the document RFC 4875.

In a node of the communications network having the protector node function in the event of a failure affecting a primary leaf node of a point-to-multipoint primary tree:
  its receiver module 308 receives from another node upstream in the network a request to protect the primary tree by a backup branch to a backup leaf node situated downstream of said node in the event of failure affecting said primary leaf node to be protected, the backup leaf node being associated with the primary leaf node;
  a module 312 for configuring a routing rule in the routing table, denoted "Conf_R" in FIG. 2, configures a backup routing rule aiming to route packets coming from an upstream primary branch to a downstream backup branch and where appropriate to a downstream primary branch or branches, this rule being activated in the event of a fault affecting said primary leaf node to be protected.

The module 312 also configures a primary routing rule for routing packets coming from an upstream primary branch to a downstream primary branch or branches.

The module 312 also configures one or more secondary rules allowing routing of packets received with one of the backup labels to the corresponding backup branch and to a downstream primary branch or branches.

It further includes a rule activation module 314, denoted "Actin" in FIG. 2, for activating a backup routing rule and deactivating a primary routing rule as a function of a failure detected by the failure detection module 310. The module 314 also activates the primary routing rule and deactivates the backup routing rule following a request from the root node in the event of detection of the end of the failure by the module 310.

In one implementation, the protection request is a request to set up a point-to-multipoint tree including a list of downstream primary leaf nodes, a list of explicit paths to the primary leaf nodes, a field indicating that the point-to-multipoint tree must be set up using the PEP mechanism, a list of backup leaf nodes, a backup leaf node being associated with a primary leaf node, and a list of explicit paths to the backup leaf nodes.

The sending module 306 may further send the root node a failure notification to the root node of the primary tree in the event of detection of a failure affecting a primary leaf node to be protected.

The modules 306, 308, 312, 314 of the protector node implement the protection method described above. They are preferably software modules comprising software instructions for executing the steps of the protection method described above that are executed by a node of the communications network. Thus the invention also relates to:
  a program for nodes of a communications network comprising program instructions intended to control the execution of those of the steps of the protection method described above that are executed by said node when said program is executed thereby; and
  a storage medium readable by a node of a communications network storing the program for the nodes of a communications network.

The software modules may be stored in or transmitted by a data medium. This may be a hardware storage medium, for example a CD-ROM, a magnetic diskette or a hard disk, or a transmission medium such as an electrical, optical or radio signal, or a telecommunications network.

The invention further relates to a communications system in a communications network in connected mode, including:
  at least one root node, said root node being the root of a point-to-multipoint primary tree to primary leaf nodes, including sending means for sending a request to protect the primary tree by means of backup branches to backup leaf nodes situated downstream of said node in the event of a failure affecting one of the primary leaf nodes to be protected, a backup leaf node being associated with a primary leaf node;
  at least one protector node as described above; and
  primary and backup leaf nodes.

It should be noted that the description relates to the particular circumstance of an MPLS communications network supporting the RSVP-TE protocol. The method may nevertheless be implemented in other types of communications network if it is possible in that network to set up connections with reservation of resources. This refers to connected mode packet transport networks. For example, an Asynchronous Transfer Mode (ATM) communications network supporting Private Network-To-Network Interface Asynchronous Transfer Mode (PNNI-ATM) signaling allows such connections to be set up. Thus a message requesting setting up of a point-to-multipoint tree with reservation of resources corresponds to a "Setup" message and a set-up confirmation message corresponds to a "Connect" message, for example.

The invention claimed is:
1. A method of protecting, in a communications network in connected mode, a point-to-multipoint primary tree comprising a root node and primary leaf nodes of the network, said primary leaf nodes having no child nodes in the network, in the event of a failure at one of the primary leaf nodes, including the following steps executed by a node of the network:

receiving from another network node a request to protect the primary tree by at least one backup branch leading to a backup leaf node having no child node and situated downstream from said another node in the network in an event of a failure affecting at least one of the primary leaf nodes to be protected, the backup leaf node being associated with the primary leaf node to be protected;

if the node is upstream from at least one backup leaf node, configuring at least one activated secondary routing rule to route packets coming from an upstream backup branch to the downstream backup branch and, where appropriate, to downstream primary branches; and if the node is connected directly to the downstream primary leaf node to be protected, configuring a backup routing rule to route packets from an upstream primary branch leading to a downstream backup branch and, if appropriate, to a primary downstream branch or branches that is activated in an event of a failure affecting said primary leaf node to be protected.

2. The protection method according to claim 1, wherein a request for setting up the backup branch is associated with the protection request, the configuration step being effected when the backup branch from said node is set up to a downstream node.

3. The protection method according to claim 2, wherein a request to set up the primary tree is associated with the protection request, the configuration step being effected when at least one primary branch from said node is set up to a downstream node.

4. The protection method according to claim 1, further comprising, if a failure is detected affecting said primary leaf node to be protected, notifying said failure to the root node of the primary tree.

5. A protector node in a communications network in connected mode for a point-to-multipoint primary tree between a root node and primary leaf nodes of the network, the primary leaf nodes having no child nodes in the network, in the event of a failure at one of the primary leaf nodes, comprising:
a receiver comprising a processor for receiving from another network node a request to protect the primary tree via a backup branch leading to a backup leaf node situated downstream from said node, the backup leaf node having no child nodes in the network, in an event of a failure affecting said primary leaf node to be protected, the backup leaf node being associated with the primary leaf node to be protected;
a processor operative to execute a configuration routine for configuring at least one activated secondary routing rule to route packets coming from an upstream backup branch to the downstream backup branch and, where appropriate, to downstream primary branches; and
a processor operative to execute a configuration routine for configuring a backup routing rule to route packets from an upstream primary branch leading to a downstream backup branch and, if appropriate, to downstream primary branches activated in an event of a failure affecting the primary leaf node to be protected.

6. The protector node according to claim 5, further comprising a notifier comprising a processor for sending a failure notification to the root node of the primary tree in the event of detection of a failure affecting a primary leaf node to be protected.

7. A communications system in a communications network in connected mode, comprising:
at least one root node, said root node being the root of a point-to-multipoint primary tree to primary leaf nodes, comprising a sender for sending a request to protect the primary tree via a backup branch to a backup leaf node situated downstream of said root node in an event of a failure affecting one of the primary leaf nodes to be protected, the backup leaf node being associated with the primary leaf node to be protected;
at least one protector node according to claim 6; and
primary and backup leaf nodes having no child nodes in the network.

8. A non-transitory computer program product comprising instructions for execution by a node of a communications network in connected mode when that program is executed by a processor of a method of protecting, in a communications network in connected mode, a point-to-multipoint primary tree between a root node and primary leaf nodes of the network, the primary leaf nodes having no child nodes in the network, in the event of a failure at one of the primary leaf nodes, including the following steps executed by the node:
receiving from another network node a request to protect the primary tree by at least one backup branch leading to a backup leaf node having no child nodes in the network and situated downstream from said node in an event of a failure affecting at least one of the primary leaf nodes to be protected, the backup leaf node being associated with the primary leaf node to be protected;
if the node is upstream from at least one backup leaf node, configuring at least one activated secondary routing rule to route packets coming from an upstream backup branch to the downstream backup branch and, where appropriate, to downstream primary branches; and
if the node is connected directly to the downstream primary leaf node to be protected, configuring a backup routing rule to route packets from an upstream primary branch leading to a downstream backup branch and, if appropriate, to a primary downstream branch or branches that is activated in an event of a failure affecting said primary leaf node to be protected.

9. A method for operating a communications network, comprising sending a signal by a node of a communications network to another node of the network and carrying a request to protect a point-to-multipoint primary tree between a root node and primary leaf nodes of the network, the primary leaf nodes having no child nodes in the network, in an event of a failure at one of the primary leaf nodes to be protected via a backup branch to a backup leaf node having no child nodes in the network and situated downstream of said other node, the backup leaf node being associated with the primary leaf node to be protected; the method comprising if said other node is upstream from at least one backup leaf node, configuring at least one activated secondary routing rule to route packets coming from an upstream backup branch to the downstream backup branch and, where appropriate, to downstream primary branches.

* * * * *